June 20, 1950  F. E. KNAPP, JR  2,512,339
EJECTOR UNLOADING APPARATUS FOR VEHICLES
Filed April 22, 1948  4 Sheets-Sheet 1
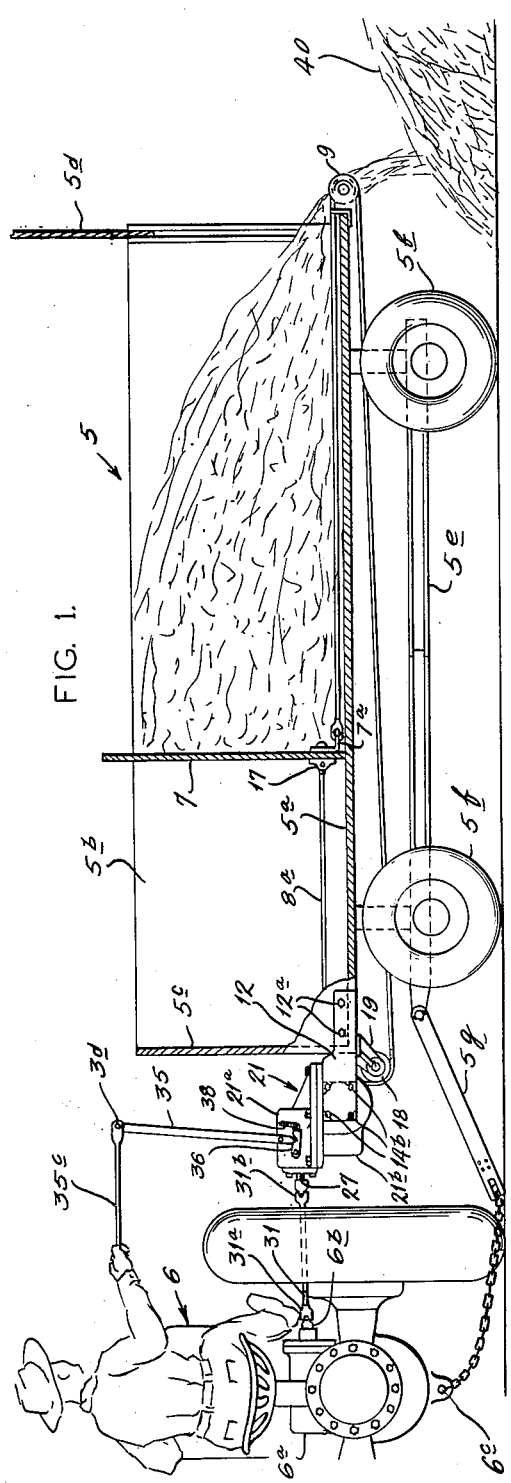
INVENTOR:
Fred E. Knapp, Jr
BY
ATTORNEY.

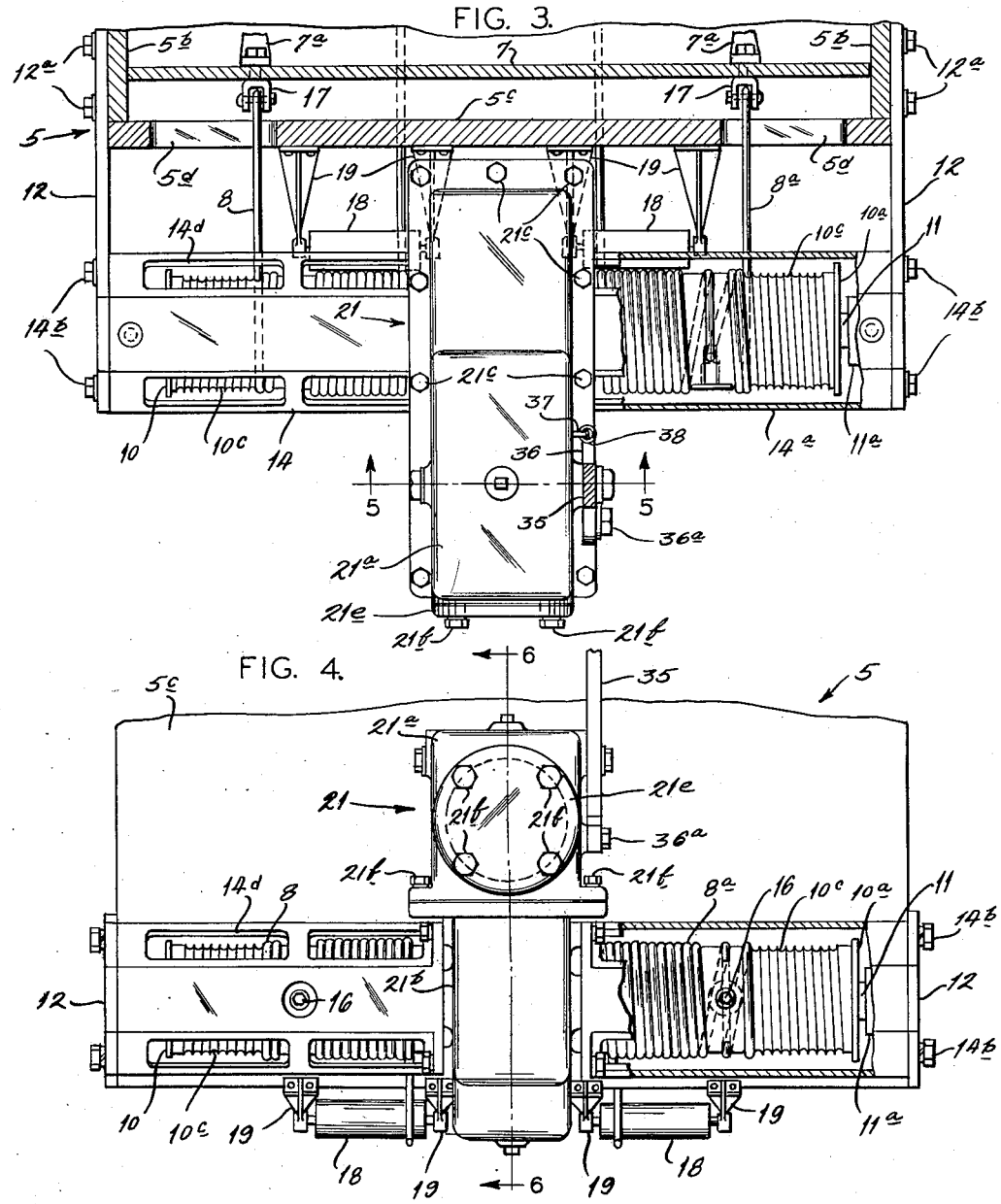

June 20, 1950 F. E. KNAPP, JR 2,512,339
EJECTOR UNLOADING APPARATUS FOR VEHICLES
Filed April 22, 1948 4 Sheets-Sheet 3
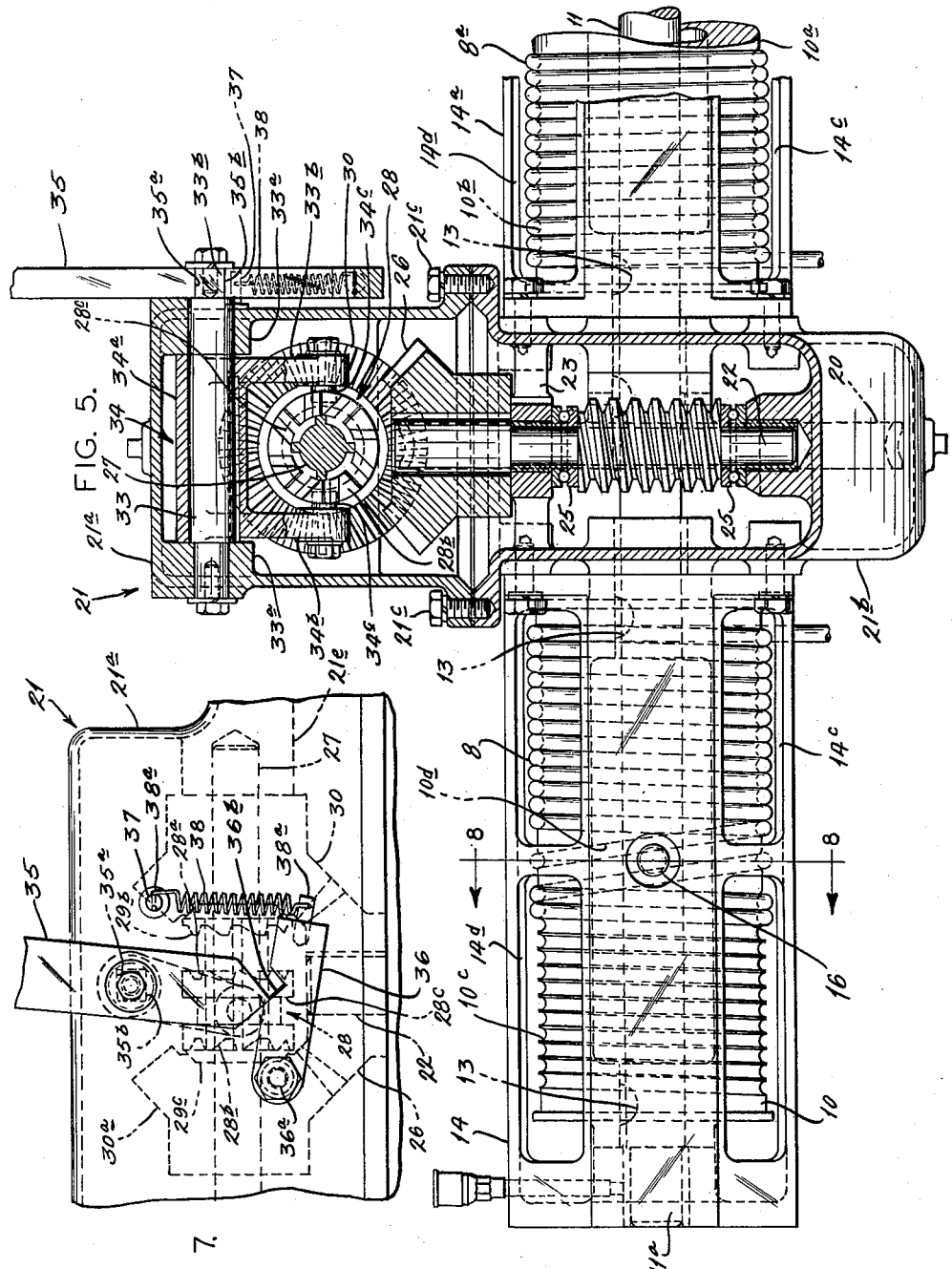
INVENTOR:
Fred E. Knapp, Jr.,
BY
ATTORNEY.

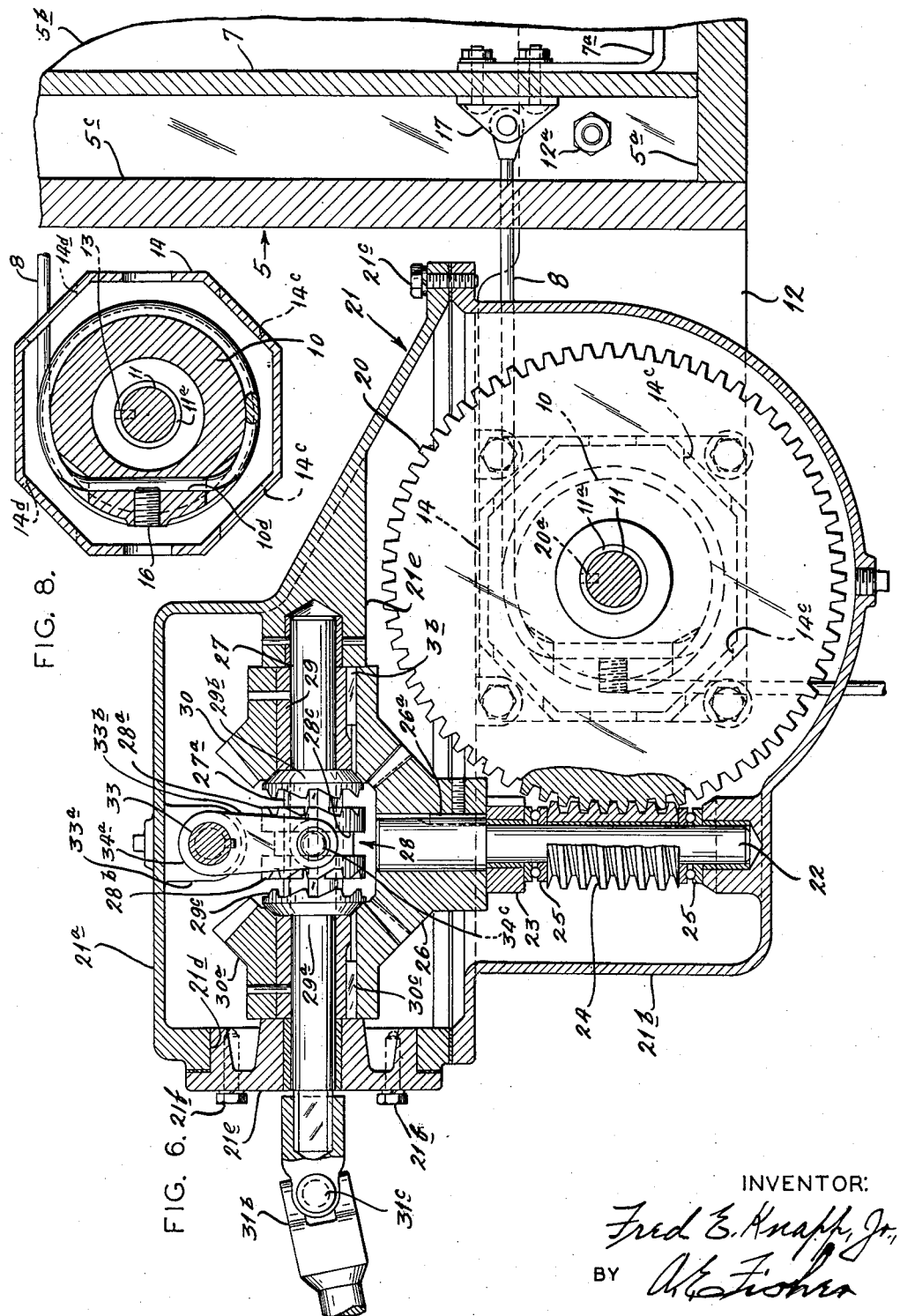

Patented June 20, 1950

2,512,339

UNITED STATES PATENT OFFICE 2,512,339

EJECTOR UNLOADING APPARATUS FOR VEHICLES

Fred E. Knapp, Jr., Cissna Park, Ill.

Application April 22, 1948, Serial No. 22,524

3 Claims. (Cl. 214—82)

This invention relates to unloading apparatus for mounting upon the running gear or chassis of a conventional box wagon, such as commonly used upon a farm or other location for moving comminuted materials of any kind, such as grain, chopped hay, corn, sand, gravel or other granular substances from place to place and unloading the same.

The chief object of the invention is to provide in relatively simply and practical form, an unloading apparatus of this kind which may be mounted upon the running gear or chassis of a conventional box wagon, or attached to a box of such wagon, and connected with and operated by a motor tractor or other source of power through a suitable connecting shaft extended from the power take-off shaft of the tractor or other source of power to the driven shaft of the unloading apparatus as mounted upon the wagon containing the material to be unloaded.

Another object of the invention is to provide for a conventional box-wagon, an unloading apparatus of the kind referred to and mounted thereon, the same including a push-plate positioned transversely, vertically and reciprocably within the wagon-box between the side-plates thereof, and arranged for movement forwardly for enabling the loading of material into the wagon-box, and rearwardly thereafter at the place of unloading the material, for pushing such material out of the rear end of the wagon-box, the rear end-gate of the box having first been removed for such unloading operation, and power controlled and operated means for so moving the push-plate forwardly and rearwardly for the purposes specified.

Another object of the invention is to provide a wagon-box for mounting upon the running gear or chassis of a wagon, the said box having a bed plate, side plates, fixed front end plate and removable rear end gate, a push plate or unloading plate mounted freely, transversely and vertically within the wagon-box and arranged for movement forwardly and rearwardly therein, a pair of flexible cables extended laterally above and below the bed-plate of the wagon box, these cables being fastened at their ends overlying the bed-plate to brackets secured laterally to the rear side of the lower margin of the push-plate, said cables being passed over pulleys mounted laterally on the rear end of the bed-plate and thence passed forwardly below the bed-plate and over rotatable drums or spools of winches mounted at the forward end of the box and thereat fastened to the drums for preventing slippage of the cables thereon, and controllable power operated means for rotating the winch-drums in either direction, for moving the said push-plate within the wagon-box forwardly for clearing the box for receiving a load of material or rearwardly for discharging the same.

With the stated objects in view, together with such other objects and advantages as may appear from the specification, attention is directed to the accompanying drawing as illustrating a preferred embodiment of the invention, and wherein Figure 1 is a longitudinal vertical sectional view of a truck, showing my unloading apparatus mounted thereon and in process of operation by a conventional motor tractor. The truck with unloading apparatus as shown in this view is taken on the line I—I of Figure 2.

Figure 2 is a plan view of the unloading apparatus as mounted on a truck, as shown in Figure 1.

Figure 3 is an enlarged plan view of the front end of the truck body, with push-plate mounted therein, and cable drums and operating winch for moving the push-plate back and forth within the truck body.

Figure 4 is a frontal elevation of the assembly shown in Figure 3.

Figure 5 is a vertical cross-section on an enlarged scale, taken on the line 5—5 of Figure 3, the outer end of the cable-drum at the right being broken off.

Figure 6 is a vertical longitudinal section on an enlarged scale, taken on the line 6—6 of Figure 4.

Figure 7 is a detail view in side elevation and on an enlarged scale, of the device for automatically throwing the gear shift mechanism into neutral position, when the operator releases the control lever of this mechanism.

Figure 8 is a vertical, transverse section, taken on the line 8—8 of Figure 5, showing the method of fastening the cables to the winch-drums.

The unloading apparatus of this invention is designed for mounting upon a conventional wheel-borne box-wagon such as represented generally at 5, the elongated and rectangular box thereof including a bed-plate 5a, vertical side plates 5b, a fixed frontal end-plate 5c, and a removable rear end-gate as indicated in raised position at 5d, this box being mounted upon the running gear or chassis 5e as carried on the wheels 5f. A tongue 5g is extended at the forward end of the running gear as means for attachment to a motor tractor 6, having a motor 6a and power take-off shaft 6b, for moving the wagon and attached unloading apparatus from place to place as may be desired.

In accordance with the invention, a push-plate or unloading plate 7 is mounted freely, transversely and vertically within the wagon-box, upon the bed-plate 5a, between the side plates 5b, and is arranged for movement forwardly and rearwardly therein, over the bed plate 5a. This reciprocating movement of the push-plate 7 is accomplished by means of a pair of right and left flexible cables 8, 8a, respectively extended laterally above and below the bed-plate 5a of the wagon-box, these cables being fastened at their rear ends overlying the bed-plate to angular brackets 7a mounted on the rear side of the lower margin of the push-plate 7, thence passed rearwardly over pulleys 9 mounted laterally on the rear end of the bed plate 5a, and thence passed forwardly below the bed-plate and over and around rotatable drums or spools 10, 10a, which are mounted in spaced relation on the ends of the drive shaft 11 journaled at its ends as at 11a in the forwardly extended ends of the arms 12 bolted as at 12a to the outer sides of the side plates 5b of the wagon-box, at the forward end thereof. The drums or spools 10, 10a, are keyed at 13 to the ends of the shaft 11. The shaft 11 and drums 10, 10a are inclosed in housings 14, 14a, bolted at 14b to the arms 12, and additionally supported by brackets 15 extended from the frontal end plate 5c. The extended ends of the cables 8, 8a, as passed forwardly below the bed-plate 5a, enter the housings 14, 14a, through elongated slots 14c formed medially through the lower walls of the housings.

The drums or spools 10, 10a, are formed respectively with left and right hand helical grooves 10b, 10c, and after the cables 8, 8a, are passed into the housings in manner aforesaid, they are drawn taut, thus pulling the push-plate 7 fully forward up to the frontal end-plate 5c, as shown in Figure 3, and the slacks of the cables are taken up by starting at the inner ends of the drums and winding the cables up outwardly along the drums and in the helical grooves thereof to the approximate centers of the drums, where they are fastened to the drums against slippage by passing the cables through holes 10d formed transversely and eccentrically through the drums, as shown in Figure 8, and passing set screws 16 through the adjacent peripheral portions of the drums and seating these screws against strands of the cables. The cables 8, 8a, are then given two or three additional turns in the grooves, and the free ends of the cables are then passed through elongated slots 14d formed in the upper sides of the housings 14, 14a. The forward free ends of the cables are finally passed through horizontally elongated slots 5d formed through the end plate 5c of the wagon 5, and are fastened to brackets 17 anchored to the frontal side of the lower margin of the push-plate 7, all as shown in Figure 3.

As shown in the present drawings, the cables 8, 8a, as they pass forwardly under the bed-plate 5a, are passed over rollers 18 bracketed at 19 to the frontal end plate 5c, before entering the housings 14, 14a, but if preferred, these rollers may be omitted. Likewise, the helical grooving of the drums 10, 10a, may be omitted, if desired.

A suitably heavy spur drive-gear 20 (Figure 6) is keyed as at 20a to the drive-shaft 11 between the spaced housings 14, 14a, and a gear housing 21 is mounted over this gear, the said gear housing being firmly anchored to the inner ends of the drum housings 14, 14a, by welding or other conventional manner. The gear housing 21 includes an upper, horizontal and forwardly extended cover portion 21a and a lower, vertically pendant portion 21b, these two portions being bolted together as at 21c. The forward end of the cover portion 21a is formed with a work opening 21d closable by means of a bearing plate 21e removably mounted in place by set screws or bolts 21f. A vertical gear shaft 22 is journaled through a bearing brace 23 mounted transversely through the lower housing 21b, the lower end of this shaft being seated in the pillow block 21d formed integrally in the bottom of the housing 21b. A worm gear 24 is rigidly anchored on the shaft 22 and placed in mesh with the drive gear 20, this worm gear being supported at its ends between the ball bearing units 25. A bevelled pinion gear 26 is keyed at 26a to the upper end of the shaft 22 above the bearing brace 23. A horizontal gear shaft 27 is journaled through the bearing plate 21e of the upper housing 21a, the inner end of this shaft being seated in the pillow block 21e formed integrally at the inner end of this housing. The shaft 27 is splined medially at 27a, thereby slidably mounting a clutch member 28 which has the ratch pinions 28a, 28b, rigidly mounted at its ends, thus leaving an intervening annular groove, slot or channel 28c, for a purpose later explained. Rotatably mounted on the shaft 27, at opposite sides of the slidable clutch member 28, are positive clutch members 29, 29a, which have the ratchet pinions 29b, 29c, rigidly anchored on their inner ends and adapted to alternately intermesh with the complemental ratch pinions 28a, 28b, of the slidable clutch member 28 as the latter is shifted laterally to one side or the other, in the manner later described. Bevelled pinion gears 30, 30a, are keyed at 30b, 30c, to the clutch members 29, 29a, and these bevelled gears 30, 30a, are placed in mesh with the complemental bevelled gear 26 of the shaft 22.

The apparatus as here shown and described is operated by a motor tractor 6, through a connecting power transmission shaft 31, one end thereof being joined as at 31a to the power take-off shaft 6b of the motor tractor, and the opposite end joined as at 31b to the power receiving or driven gear shaft 27 of the unloading apparatus. Any suitable form of transmission shaft may of course be used, such as a flexible shaft (not shown) or the rigid shaft as here shown, and provided with universal joint connections such as shown at 31c. Such shafts and connections are of common use. Likewise any form of motor tractor may be employed, with a power take-off shaft projected laterally as here shown, or straightly rearward, and not here shown. Also any usual form of hitch, such as shown at 6c in Figure 1, may be employed and extended from the tractor 6 for engaging the forward end of the tongue 5g of the wagon 5, for the purpose of moving the wagon and unloading apparatus from place to place.

For the purpose of shifting the slidable clutch member 28 from side to side for alternately intermeshing the ratch pinions 28a, 28b, with the positive clutch ratch pinions 29b, 29c, or to a medial neutral position, a gear-shift shaft 33 is journaled as at 33a transversely through the upper gear housing 21a (Figures 5, 7) this shaft being extended out through the left side of the housing as at 33b. A yoke 34 is provided, the same being formed with an upper tubular sleeve 34a, aligned, pendant arms 34b at its ends, and with inturned lugs 34c at the lower ends of the arms 34b. This yoke is mounted in place within the housing 21a and upon the shaft 33 by passing the arms 34b downwardly over the slidable clutch member 28 with the arms 34b astraddle of the member and the lugs 34c entered at each side into the angular groove or slot 28c thereof, and then passing the shaft 33 through the journal bearings 33a of the housing and keying the sleeve 34a to the shaft 33 in conventional manner.

An upwardly extended gear shift lever 35 is apertured as at 35a through a point substantially spaced above its lower extremity, for engaging the outwardly extended end 33b of the shaft 33, to which it is firmly locked as indicated at 35b. A handle extension 35c is hingedly connected to the upper end of the gear shift lever 35, as indicated at 35d, for the convenience of the operator, as illustrated in Figure 1.

For automatically supporting the gear shift mechanism to inoperative neutral position and returning it to such position after operation, a short neutralizing lever 36 (Figure 7) is horizontally pivoted as at 36a to the left side of the housing 21a, and this lever is passed horizontally below the lower end of the gear shift lever 35. An eye-bolt 37 is seated in the side of the housing 21a rearwardly of the extended end 33b of the shaft 33 and substantially above and in vertical alignment with the rear end of the neutralizing lever 36, and a strong coil spring 38 is stretched and fastened at its ends between the eye-bolt 37 and the rear free end of the lever 36, as shown at 38a. This lever is deeply and angularly notched through as shown at 36b, in a V-shaped manner, the sides of this notch being bevelled down equally at each side, as shown. The lower end of the gear shift lever 35 is correspondingly bevelled off and pointed as shown at 35e, whereby with the lever 35 positioned vertically and the slidable clutch member in its corresponding neutral position on the shaft 27, the pointed lower end 35e will fully seat within the V-shaped notch 36b, and thus hold the lever 35 in neutral position. Similarly, when the lever 35 has been oscillated to either side of the vertical for the purpose of shifting gears of the apparatus, the spring 38 will, after the lever is released by the operator, pull upwardly on the neutralizing lever 36 and cause the bevelled end of the lever 35 to slide fully down into the V-shaped notch 36b of the lever 36, thus raising the lever 35 vertically to neutral position, and moving the operating gears also to neutral position.

In use and with the construction as shown, the operator by moving the lever 35 to the right, thereby sliding the clutch member 28 forwardly or towards the left, thus intermeshing the ratch pinions 28b, 29c, and causing the pinion gear 26 and the drive gear 20 to rotate for example in an anti-clockwise direction, and pulling the push-plate 7 forwardly to the position shown in Figure 3. This operation clears the wagon box for receiving a load of material, such as chopped hay or fodder, as indicated at 40 in Figures 1 and 2. The gear shift lever 35 is then released to neutral position and the rear end gate 5d is closed down and the loaded wagon is hitched to the tractor 6 by connecting the tongue 5g with the hitch 6c of the tractor 6. Arrived at the place of unloading, the wagon is unhitched from the tractor, the rear end gate 5d is removed, and the power transmission shaft 31 is employed in the manner already explained for connecting the gear shaft 27 of the apparatus with the power take-off shaft 6b of the tractor 6. The lever 35 is then pulled to the left, thereby sliding the clutch member 28 rearwardly, or towards the right and thereby meshing the ratch pinions 28a, 29b, and causing the drive gear 20 to rotate clockwise for pulling the push plate 7 rearwardly and discharging the load 40 out through the open rear end of the wagon. In this operation the cables 8, 8a, as passed forwardly under the wagon, are wound up onto the outer ends of the drums 10, 10a.

While I have here shown and described a preferred embodiment of my unloading apparatus, the specific structural features thereof as shown may be changed or modified as desired, within the scope of the claims.

I claim:

1. The combination with a rectangularly elongate wagon box for mounting upon the running gear of a wagon, the said wagon box including a bed plate, upright side and front end plates, of a push-plate mounted freely, transversely and vertically within the wagon box and arranged for movement forwardly and rearwardly therein, a pair of flexible cables passed laterally above and below the bed plate of the wagon box, said cables being fastened at their ends over-lying the bed plate to brackets secured laterally to the rear side of the lower margin of the push plate and thence passed rearwardly over pulleys mounted laterally on the rear end of the bed plate, and thence passed forwardly below the bed plate, a winch drive shaft journaled transversely at the forward end of the wagon box outwardly of the front end plate, a pair of winch drums rigidly keyed upon the ends of the winch shaft, the forward ends of the said cables as extended forwardly below the bed plate being fastened to the said drums, controllable power means for rotating the winch drive shaft and drums in either direction, for moving the said push plate within the wagon box forwardly for clearing the box for receiving a load of material, or rearwardly for discharging the same, the said winch drums being spaced apart medially on the winch drive shaft to provide a seating for a spur drive gear, and the said controllable power means for operating the winch mechanisms including a spur drive gear keyed upon the winch drive shaft between the winch drums, housings mounted over the said winch drive shaft, winch drums and drive gear, a gear shaft journaled vertically within the housings, a worm gear keyed to the gear shaft and placed in mesh with the spur drive gear, a bevelled pinion gear keyed on the upper end of the vertical gear shaft, a bevelled pinion gear keyed on the upper end of the vertical gear shaft, a horizontal gear shaft journaled upwardly and longitudinally within the housings, power controlled means for rotating said horizontal gear shaft, a clutch member slidably keyed upon the horizontal gear shaft, ratch pinions rigidly mounted at the ends of the slidable clutch member in a spaced relation for providing an intermediate annular channel, positive clutch members rotatably mounted on the horizontal gear shaft at opposite sides of the slidable clutch member, the same including ratchet pinions on their inner ends adapted to alternately intermesh with the ratch pinions of the slidable clutch member as the latter is shifted from side to side, and including bevelled pinion gears in mesh with the complemental bevelled pinion gear at the upper end of the said vertical gear shaft, a gear shift lever extended down vertically into the housing and pivotally supported at its lower end therein, the same having a yoke at its lower end placed astraddle the said slidable clutch member, the yoke in turn having lugs extended horizontally into the annular channel between the ratch pinions of the said slidable clutch member, whereby by shifting the upper end of the gear shift lever forwardly or rearwardly, the direction of rotation of the gears and winch drums may be controlled through the intermeshing of the said ratch pinions of the slidable and positive clutch members.

2. In an assembly according to claim 1, means for automatically holding the said slidable clutch member to its neutral position, when its ratch pinions are not intermeshed with either of the ratch pinions of the positive clutch members.

3. In an assembly according to claim 1, housings for the said winch drive shaft and drums and said gear shift devices.

FRED E. KNAPP, JR.

REFERENCES CITED

The following references are of record in the file of this patent:

UNITED STATES PATENTS

| Number | Name | Date |
| --- | --- | --- |
| 1,038,230 | Tansill | Sept. 10, 1912 |
| 2,462,404 | Kahres et al. | Feb. 22, 1949 |
| 2,463,643 | Recker | Mar. 8, 1949 |

FOREIGN PATENTS

| Number | Country | Date |
| --- | --- | --- |
| 419,351 | Great Britain | Nov. 9, 1934 |